United States Patent
Xie

(10) Patent No.: US 9,963,635 B2
(45) Date of Patent: May 8, 2018

(54) BLUE PHASE LIQUID CRYSTAL DISPLAY DEVICE AND METHOD FOR DRIVING THE SAME

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Chang Xie, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days. days.

(21) Appl. No.: 14/786,051

(22) PCT Filed: Jul. 1, 2015

(86) PCT No.: PCT/CN2015/083078
§ 371 (c)(1),
(2) Date: Dec. 13, 2016

(87) PCT Pub. No.: WO2016/206130
PCT Pub. Date: Dec. 29, 2016

(65) Prior Publication Data
US 2017/0166813 A1    Jun. 15, 2017

(30) Foreign Application Priority Data
Jun. 25, 2015  (CN) .......................... 2015 1 0359121

(51) Int. Cl.
G09G 3/36  (2006.01)
C09K 19/02  (2006.01)
(Continued)

(52) U.S. Cl.
CPC .......... C09K 19/0275 (2013.01); G02F 1/137 (2013.01); G02F 1/1343 (2013.01);
(Continued)

(58) Field of Classification Search
CPC .... C09K 19/0275; G09G 3/36; G02F 1/1343; G02F 1/137; G02F 1/134309; G02F 1/13439; G02F 2001/13793
See application file for complete search history.

(56) References Cited

U.S. PATENT DOCUMENTS

2009/0303420 A1* 12/2009 Kim ...................... G02F 1/1323
349/96
2011/0136277 A1* 6/2011 Park .................. G02F 1/134363
438/34

(Continued)

FOREIGN PATENT DOCUMENTS

CN    1892370    1/2007
CN    101097316    1/2008
(Continued)

OTHER PUBLICATIONS

International Search Report and Written Opinion for International Application No. PCT/CN2015/083078, dated Mar. 31, 2016.
(Continued)

Primary Examiner — Claire X Pappas
Assistant Examiner — Gerald Oliver
(74) Attorney, Agent, or Firm — Kim Winston LLP

(57) ABSTRACT

A blue phase liquid crystal display device and a method for driving the same are disclosed. In the display device, there is a pixel electrode or a common electrode arranged right opposite to each of the viewing angle switching electrodes. In a narrow viewing angle mode, a vertical electric field can be generated between two electrodes that are arranged right opposite to each other, so that liquid crystal molecules in the
(Continued)

vertical electric field can be in a vertical alignment state. According to the present disclosure, since almost all oblique light can pass through the liquid crystal molecules in the vertical alignment state, the probability that the viewing angle switching dead area occurs can be reduced to a large extent.

10 Claims, 7 Drawing Sheets

(51) Int. Cl.
    *G02F 1/1343*     (2006.01)
    *G02F 1/137*     (2006.01)

(52) U.S. Cl.
    CPC .... *G02F 1/13439* (2013.01); *G02F 1/134309* (2013.01); *G09G 3/36* (2013.01); *G02F 2001/13793* (2013.01)

(56) References Cited

U.S. PATENT DOCUMENTS

2012/0105751 A1*   5/2012   Mao .................. G02F 1/133553
                                                                                          349/33
2014/0002761 A1*   1/2014   Heo ...................... G02F 1/1343
                                                                                          349/33
2016/0341987 A1*  11/2016   Chung .................. G02F 1/1323

FOREIGN PATENT DOCUMENTS

| CN | 101526702 | 9/2009 | | |
|---|---|---|---|---|
| CN | 102253541 | 11/2011 | | |
| CN | 102854670 | 1/2013 | | |
| CN | 103091883 | 5/2013 | | |
| CN | 103339557 | 10/2013 | | |
| CN | 103365002 | 10/2013 | | |
| CN | 103792742 | 5/2014 | | |
| CN | 104360516 | 2/2015 | | |
| CN | 104460138 | 3/2015 | | |
| KR | 1020040061447 | 7/2004 | | |
| KR | 20080051536 A | * | 6/2008 | ........... G02F 1/1343 |
| WO | 2013191004 | 12/2013 | | |

OTHER PUBLICATIONS

Chinese Office Action and Search Report for Chinese Patent Application No. 201510359121.X, dated May 26, 2017.

* cited by examiner

BLUE PHASE LIQUID CRYSTAL DISPLAY DEVICE AND METHOD FOR DRIVING THE SAME

CROSS REFERENCE TO RELATED APPLICATION

The present application claims benefit of Chinese patent application CN 201510359121.X, entitled "Blue Phase Liquid Crystal Display Device and Method for Driving the Same" and filed on Jun. 25, 2015, the entirety of which is incorporated herein by reference.

FIELD OF THE INVENTION

The present disclosure relates to the technical field of display, and particularly to a blue phase liquid crystal display device and a method for driving the blue phase liquid crystal display device.

BACKGROUND OF THE INVENTION

At present, the portable electronic apparatuses with liquid crystal display devices, such as mobile phones, hand-held computers, and laptops, are increasingly used. At some times, a user needs to share images displayed on a portable electronic apparatus with other people; while at other times, the user does not hope that others can see the images for the purpose of personal privacy protection. Therefore, in order to satisfy the two demands at the same time, a display device with a wide-narrow viewing angle switching function is needed.

FIG. 1 schematically shows a traditional liquid crystal display device with a wide-narrow viewing angle switching function when an upper substrate electrode is not applied with a bias voltage. As shown in FIG. 1, the liquid crystal display device in the prior art comprises an upper substrate 10, a blue phase liquid crystal layer 30, and a lower substrate 20. The upper substrate 10 and the lower substrate 20 are arranged parallel to each other, and each pixel structure is divided into a main pixel used for displaying and a sub pixel used for switching the viewing angle. The upper substrate 10 comprises an upper substrate glass layer 11, an upper substrate quarter-wave plate 12, an upper substrate half-wave plate 13, and an upper substrate polarizer 14. Similarly, the lower substrate 20 comprises a lower substrate glass layer 21, a lower substrate quarter-wave plate 22, a lower substrate half-wave plate 23, and a lower substrate polarizer 24. Pixel electrodes 25 and common electrodes 26 are arranged alternately on the lower substrate glass layer 21 in the regions where the main pixel and the sub pixel are located, and an upper substrate electrode 15 is arranged on a lower surface of the upper substrate glass layer 11 only in the region where the sub pixel is located. In the liquid crystal display device, the wide-narrow viewing angle switching function can be realized through applying the bias voltage to the upper substrate electrode 15 or not.

Specifically, still as shown in FIG. 1, when the bias voltage is not applied to the upper substrate electrode 15, the upper substrate electrode 15, the pixel electrodes 25 and the common electrodes 26 all have a zero electric potential. At this time, blue phase liquid crystal molecules in the main pixel area and blue phase liquid crystal molecules in the sub pixel area are all optically isotropic. The backlight that enters from the lower substrate 20 cannot pass through the upper substrate polarizer 14 and the lower substrate polarizer 24. Therefore, when the bias voltage is not applied, there is no light leakage when the liquid crystal display device is in a dark state, and the liquid crystal display device has a good dark state, so that a wide viewing angle can be realized.

As shown in FIG. 2, when the bias voltage is applied to the upper substrate electrode 15, the pixel electrodes 25 and the common electrodes 26 still have a zero electric potential. At this time, the blue phase liquid crystal molecules in the main pixel area are still optically isotropic. However, a vertical electric field can be generated between the upper substrate electrode 15 and the pixel electrodes 25 as well as between the upper substrate electrode 15 and the common electrodes 26 respectively. The blue phase liquid crystal molecules in the vertical electric field would deflect, and thus the blue phase liquid crystal molecules are in a vertical alignment state. When the backlight which enters from the lower substrate 20 normally passes through the blue phase liquid crystal layer 30, a polarization state of the blue phase liquid crystal molecules does not change, and thus the backlight cannot pass through the liquid crystal cell. When the backlight which enters from the lower substrate obliquely passes through the blue phase liquid crystal layer 30, the polarization state of the blue phase liquid crystal molecules would change, and thus some backlight would pass through the liquid crystal cell. Therefore, when the bias voltage is applied to the upper substrate electrode, there is the light leakage when the liquid crystal display device is in a dark state, so that a narrow viewing angle can be realized.

The defect of the aforesaid liquid crystal display device is that there is a viewing angle switching dead area in the display device. The viewing angle switching dead area is the non-switchable area as shown in FIG. 3. As shown in FIG. 3, when the bias voltage is applied to the upper substrate electrode 15, the oblique light in the non-switchable area can only pass through the optically isotropic blue phase liquid crystal molecules in the main pixel area, but cannot pass through the blue phase liquid crystal molecules in the vertical alignment state in the sub pixel area. Since the wide-narrow viewing angle switching function can only be realized with respect to the oblique light which passes through the blue phase liquid crystal molecules in the vertical alignment state in the sub pixel area, the non-switchable area is the aforesaid viewing angle switching dead area. The viewing angle control effect of the liquid crystal display panel is poor due to the existence of the viewing angle switching dead area.

SUMMARY OF THE INVENTION

In order to eliminate a viewing angle switching dead area in a liquid crystal display device with a wide-narrow viewing angle switching function, the present disclosure provides a blue phase liquid crystal display device and a method for driving the blue phase liquid crystal display device.

According to one aspect, the present disclosure provides a blue phase liquid crystal display device, comprising: an array substrate polarizer; an array substrate that is formed on the array substrate polarizer; pixel electrodes and common electrodes that are formed on the array substrate, the pixel electrodes and the common electrodes being arranged alternately; a blue phase liquid crystal layer that is formed on the pixel electrodes and the common electrodes; a plurality of viewing angle switching electrodes that are formed on the blue phase liquid crystal layer, wherein a viewing angle switching electrode is arranged right above each of the pixel electrodes and right above each of the common electrodes; a color filter substrate that is formed on the viewing angle switching electrodes; and a color filter substrate polarizer that is formed on the color filter substrate.

Preferably, the viewing angle switching electrodes each are arranged parallel to the corresponding pixel electrodes or the corresponding common electrodes.

Preferably, a width of a viewing angle switching electrode is equal to a width of a corresponding pixel electrode or a width of a corresponding common electrode.

Preferably, the width of the pixel electrode is equal to the width of the common electrode, and a distance between any pixel electrode and a common electrode adjacent thereof is constant.

Preferably, a ratio of the width of the pixel electrode to the distance ranges from ⅓ to ¾.

Preferably, the viewing angle switching electrodes, the pixel electrodes, and the common electrodes are all transparent electrodes.

Preferably, the transparent electrode is one or a combination selected from a group consisting of Indium Tin Oxide (ITO) transparent electrode, Indium Zinc Oxide (IZO) transparent electrode, and Indium Gallium Oxide (IGO) transparent electrode.

Preferably, the aforesaid blue phase liquid crystal display device further comprises a driving circuit, wherein the driving circuit is used for providing, in a narrow viewing angle mode, a first bias voltage that is higher or lower than a pixel voltage to the viewing angle switching electrodes corresponding to the pixel electrodes, and a second bias voltage that is higher or lower than a common voltage to the viewing angle switching electrodes corresponding to the common electrodes, so that a vertical electric field is formed between the viewing angle switching electrodes and the corresponding pixel electrodes or between the viewing angle switching electrodes and the corresponding common electrodes.

Preferably, the first bias voltage and the second bias voltage are both equal to an average value of the pixel voltage and the common voltage.

According to another aspect, the present disclosure provides a method for driving the blue phase liquid crystal display device, comprising providing, in a narrow viewing angle mode, a first bias voltage that is higher or lower than a pixel voltage to the viewing angle switching electrodes corresponding to the pixel electrodes and a second bias voltage that is higher or lower than a common voltage to the viewing angle switching electrodes corresponding to the common electrodes, so that a vertical electric field is formed between the viewing angle switching electrodes and the corresponding pixel electrodes or between the viewing angle switching electrodes and the corresponding common electrodes.

Preferably, the first bias voltage and the second bias voltage are both equal to an average value of the pixel voltage and the common voltage.

Compared with the prior art, one embodiment or a plurality of embodiments according to the present disclosure may have the following advantages or beneficial effects.

Since in the narrow viewing angle mode, almost all oblique light can pass through the blue phase liquid crystal molecules in a vertical alignment state, in the blue phase liquid crystal display device according to the present disclosure, the probability that the viewing angle switching dead area occurs can be reduced to a large extent. Therefore, the display effect of the blue phase liquid crystal display device in the narrow viewing angle mode can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

In order to eliminate a viewing angle switching dead area in a liquid crystal display device with a wide-narrow viewing angle switching function, the embodiment of the present disclosure provides a blue phase liquid crystal display device.

Figure 1:
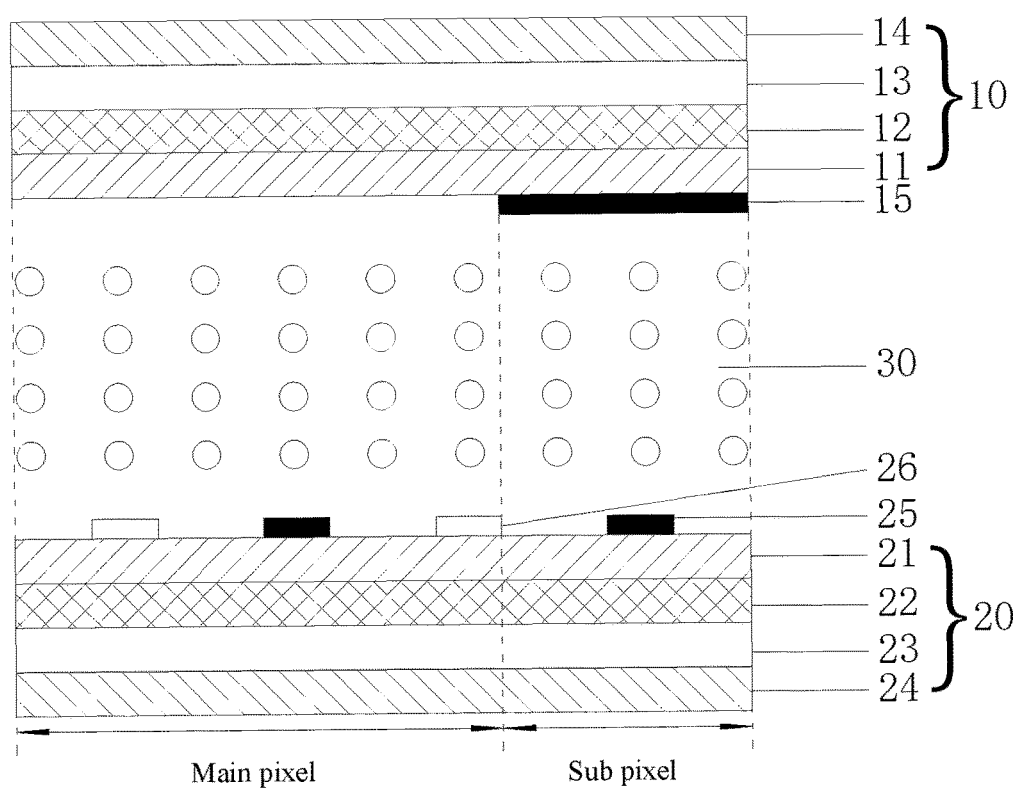
FIG. 1 schematically shows a traditional liquid crystal display device with a wide-narrow viewing angle switching function when an upper substrate electrode is not applied with a bias voltage.
Figure 2:
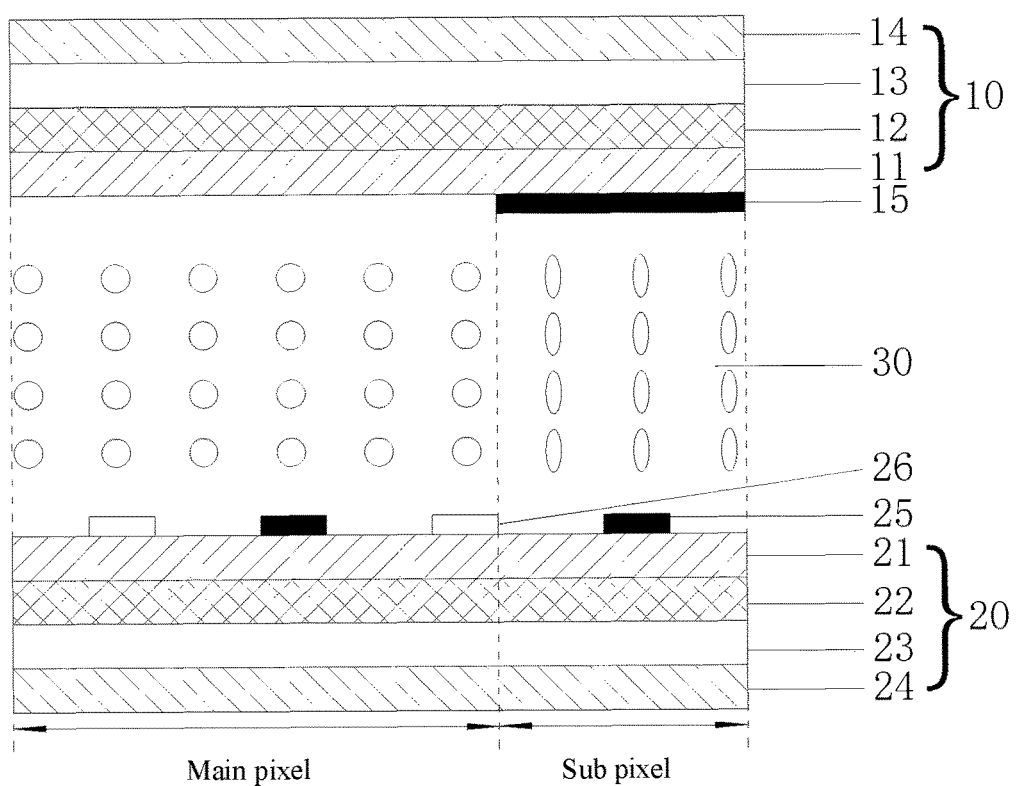
FIG. 2 schematically shows the liquid crystal display device as shown in FIG. 1 when the upper substrate electrode is applied with the bias voltage.
Figure 3:
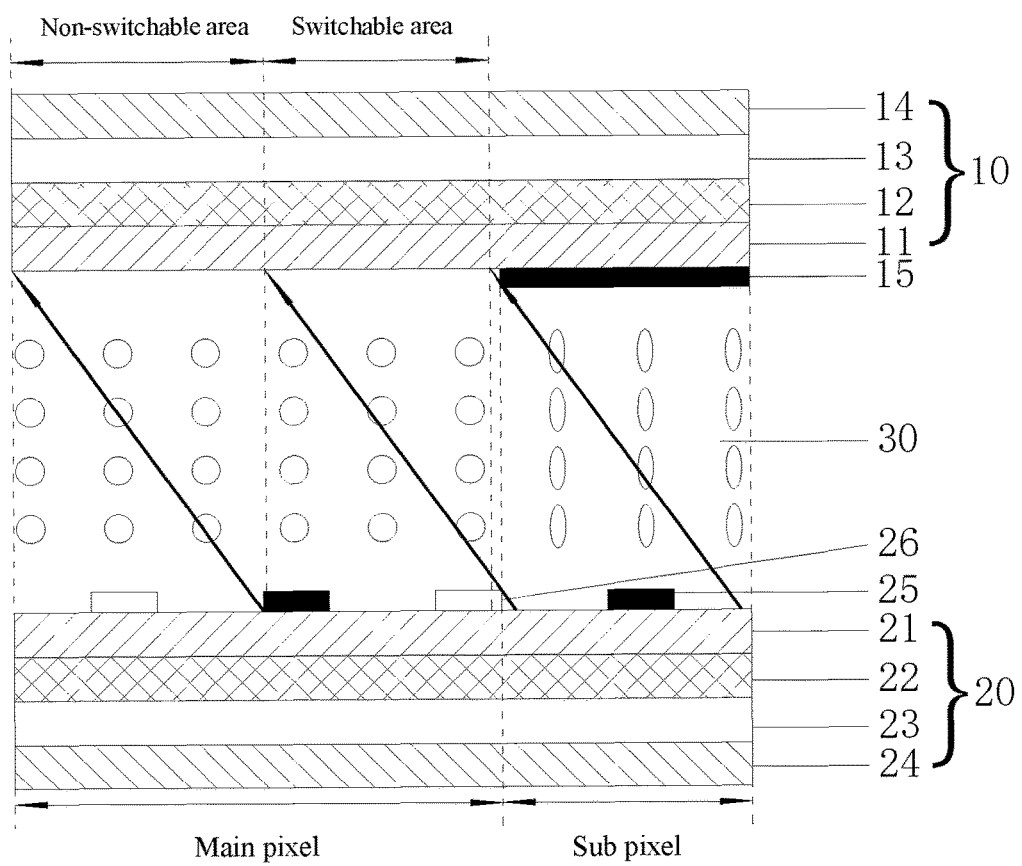
FIG. 3 schematically shows a non-switchable area and a switchable area of the liquid crystal display device as shown in FIG. 2.
Figure 4:
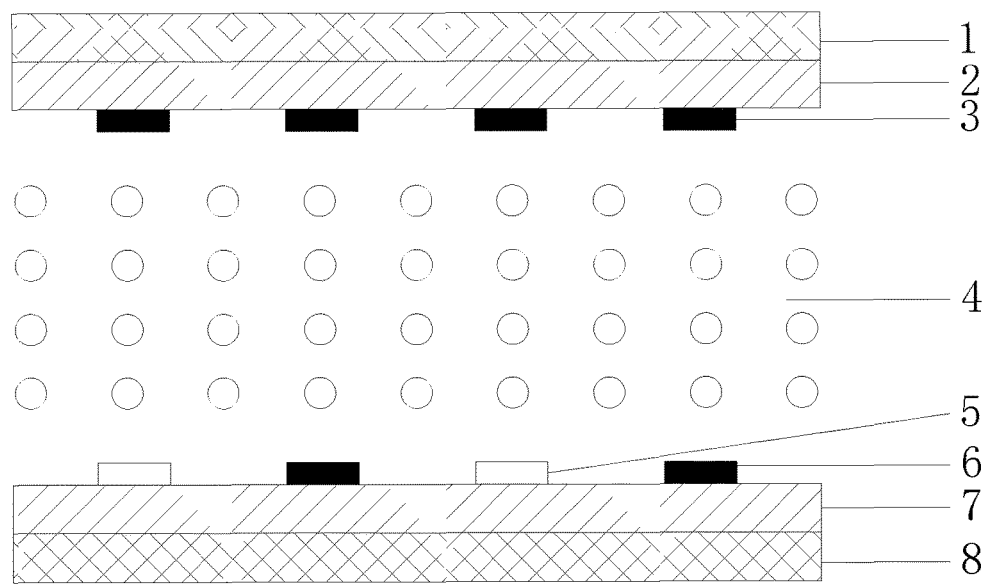
FIG. 4 schematically shows a blue phase liquid crystal display device in a dark state when the viewing angle switching electrodes are not applied with a bias voltage according to one embodiment of the present disclosure.

FIG. 4 schematically shows a blue phase liquid crystal display device when the viewing angle switching electrodes are not applied with a bias voltage according to the embodiment of the present disclosure. As shown in FIG. 4, the blue phase liquid crystal display device according to the present embodiment mainly comprises an array substrate polarizer 8, an array substrate 7, pixel electrodes 5, common electrodes 6, a blue phase liquid crystal layer 4, viewing angle switching electrodes 3, a color filter substrate 2, and a color filter substrate polarizer 1.

Specifically, the array substrate 7 is formed on the array substrate polarizer 8. The pixel electrodes 5 and the common electrodes 6 are arranged in a same layer. A pattern with the pixel electrodes 5 and the common electrodes 6 is formed on the array substrate 7, and the pixel electrodes 5 and the common electrodes 6 are arranged alternately. The blue phase liquid crystal layer 4 is formed on the pattern with the pixel electrodes 5 and the common electrodes 6. A pattern with a plurality of viewing angle switching electrodes 3 is formed on the blue phase liquid crystal layer 4. The color filter substrate 2 is formed on the pattern with the plurality of viewing angle switching electrodes 3, and the color filter substrate polarizer 1 is formed on the color filter substrate 2.

According to the present embodiment, each of the viewing angle switching electrodes 3 shall be arranged as follows. A corresponding viewing angle switching electrode 3 is arranged right above each of the pixel electrodes 5 and right above each of the common electrodes 6. In other words, there is a corresponding pixel electrode 5 or a corresponding common electrode 6 arranged right below each of the viewing angle switching electrodes 3.

When the viewing angle switching electrodes 3 are not applied with a bias voltage (i.e., the viewing angle switching electrodes 3 are empty), the viewing angle switching electrodes 3 would not affect the display effect of the blue phase liquid crystal display device. As shown in FIG. 4, when the liquid crystal display device is in a dark state, the blue phase liquid crystal molecules in the blue phase liquid crystal layer 4 are all maintained in an optically isotropic state. At this time, the blue phase liquid crystal display device works in a wide viewing angle mode.

When a first bias voltage that is unequal to a pixel voltage is applied to the viewing angle switching electrodes 3 corresponding to the pixel electrodes 5, and a second bias voltage that is unequal to a common voltage is applied to the viewing angle switching electrodes 3 corresponding to the common electrodes 6, a vertical electric field can be formed between the viewing angle switching electrodes 3 and the corresponding pixel electrodes 5 or between the viewing angle switching electrodes 3 and the corresponding common electrodes 6.

Figure 5:
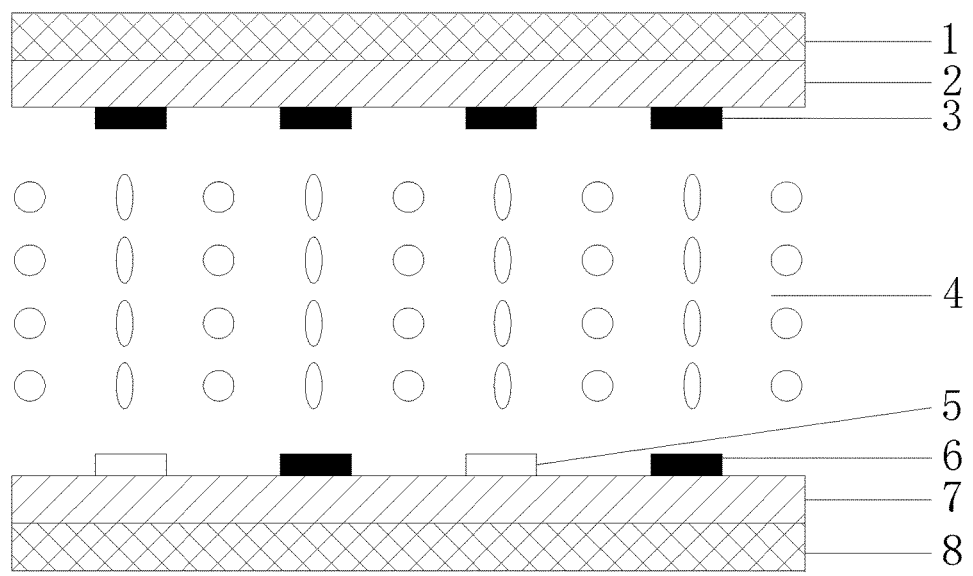
FIG. 5 schematically shows the blue phase liquid crystal display device in the dark state when the viewing angle switching electrodes are applied with the bias voltage according to the embodiment of the present disclosure.

FIG. 5 schematically shows the blue phase liquid crystal display device in the dark state when the viewing angle switching electrodes 3 are applied with the bias voltage according to the embodiment of the present disclosure. As shown in FIG. 5, when the pixel voltage that is applied to the pixel electrodes 5 is equal to the common voltage that is applied to the common electrodes 6, the blue phase liquid crystal display device is in the dark state. At this time, if the first bias voltage that is unequal to the pixel voltage is applied to the viewing angle switching electrodes 3 corresponding to the pixel electrodes 5, and the second bias voltage that is unequal to the common voltage is applied to the viewing angle switching electrodes 3 corresponding to the common electrodes 6, the vertical electric field can be formed between the viewing angle switching electrodes 3 and the corresponding pixel electrodes 5 or between the viewing angle switching electrodes 3 and the corresponding common electrodes 6.

Figure 6:
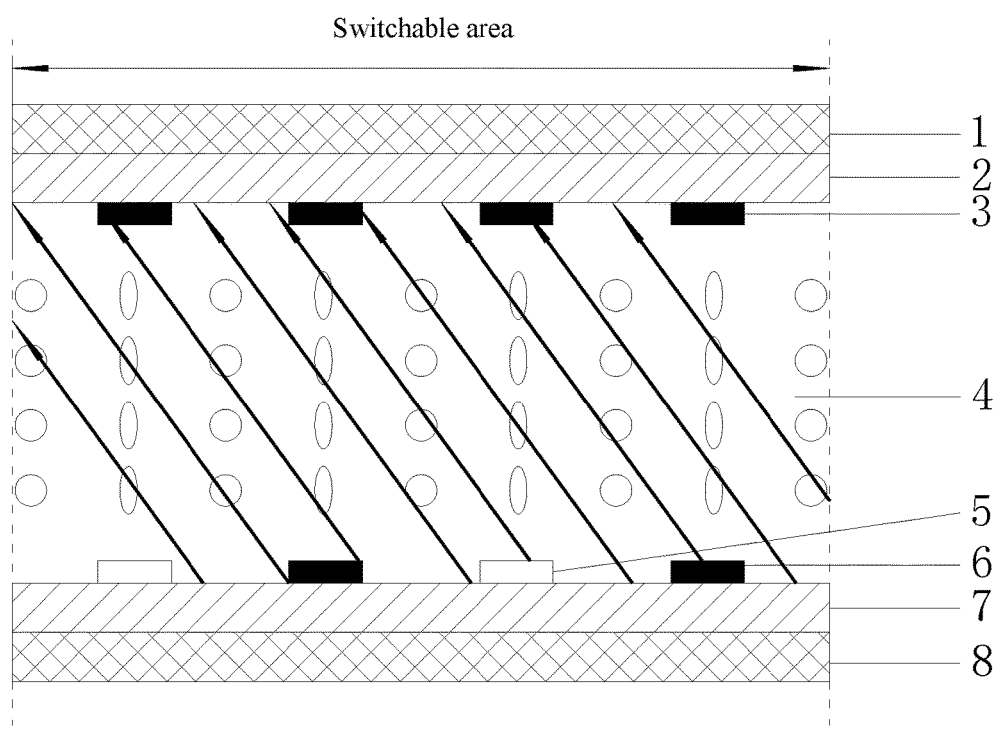
FIG. 6 schematically shows a switchable area of the blue phase liquid crystal display device as shown in FIG. 5.

The blue phase liquid crystal molecules in the vertical electric field would have a phase delay in the vertical direction under the action of the vertical electric field, and thus the blue phase liquid crystal molecules are aligned in the vertical direction. The blue phase liquid crystal molecules outside the vertical electric field are still maintained in the optically isotropic state. It can be seen clearly from FIG. 5 that, the arrays that are formed by the blue phase liquid crystal molecules in the vertical alignment state and the arrays that are formed by the blue phase liquid crystal molecules in the optically isotropic state are arranged alternately. FIG. 6 schematically shows a switchable area of the blue phase liquid crystal display device as shown in FIG. 5. As shown in FIG. 6, almost all oblique light can pass through the blue phase liquid crystal molecules in the vertical alignment state. Therefore, in the blue phase liquid crystal display device according to the present embodiment, the probability that the viewing angle switching dead area occurs can be reduced to a large extent, and thus the display effect of the blue phase liquid crystal display device in the narrow viewing angle mode can be improved.

According to one preferred embodiment of the present disclosure, the first bias voltage and the second bias voltage can both equal to an average value of the pixel voltage and the common voltage on the basis that the first bias voltage is unequal to the pixel voltage and the second bias voltage is unequal to the common voltage. According to the present embodiment, the viewing angle switching electrodes 3 are all applied with the same bias voltage, and thus the driving circuit can be simplified.

In order to further reduce the probability that the viewing angle switching dead area occurs, the property of the electrodes and the position thereof can be further defined.

According to one preferred embodiment of the present disclosure, the viewing angle switching electrodes 3 each are arranged parallel to the corresponding pixel electrodes 5 or the corresponding common electrodes 6.

According to one preferred embodiment of the present disclosure, a width of a viewing angle switching electrode 3 is equal to a width of a corresponding pixel electrode 5 or a width of a corresponding common electrode 6. Specifically, the viewing angle switching electrode 3 is arranged in alignment with the corresponding pixel electrode 5 or the corresponding common electrode 6 in vertical direction. That is, a left edge of the viewing angle switching electrode 3 and a left edge of the corresponding pixel electrode 5 or common electrode 6 are arranged in a same vertical plane, and a right edge of the viewing angle switching electrode 3 and a right edge of the corresponding pixel electrode 5 or common electrode 6 are arranged in a same vertical plane.

According to one preferred embodiment of the present disclosure, the width of the pixel electrode 5 is equal to the width of the common electrode 6, and a distance between two adjacent pixel electrode 5 and common electrode 6 is equal to a distance between any other two adjacent pixel electrode 5 and common electrode 6. Specifically, a ratio of the width of the pixel electrode 5 to the distance ranges from ⅓ to ¾. It is demonstrated by a large number of experiments that, when the ratio of the width of the pixel electrode 5 to the distance ranges from ⅓ to ¾, the viewing angle switching dead area can be eliminated completely. Specifically, the width of the pixel electrode 5 can be selected to be 2-3 μm, and the distance between the pixel electrode 5 and the common electrode 6 can be selected to be 4-6 μm. For example, if the width of the pixel electrode 5 is 2 μm, the distance can be 4 μm. For another example, if the width of the pixel electrode 5 is 3 μm, the distance can be 6 μm.

Further, the viewing angle switching electrodes 3, the pixel electrodes 5, and the common electrodes 6 are all transparent electrodes. Preferably, the transparent electrode is one or a combination selected from a group consisting of Indium Tin Oxide (ITO) transparent electrode, Indium Zinc Oxide (IZO) transparent electrode, and Indium Gallium Oxide (IGO) transparent electrode.

According to one preferred embodiment of the present disclosure, the blue phase liquid crystal display device further comprises a driving circuit. The driving circuit is used for controlling the power supply states of the pixel electrodes 5, the common electrodes 6, and the viewing angle switching electrodes 3.

Specifically, in the wide viewing angle mode, the viewing angle switching electrodes 3 are empty under the control of the driving circuit, i.e., the viewing angle switching electrodes 3 are not supplied with the power.

In the narrow viewing angle mode, the driving circuit is used for providing the first bias voltage that is higher or lower than the pixel voltage to the viewing angle switching electrodes 3 corresponding to the pixel electrodes 5, and providing the second bias voltage that is higher or lower than the common voltage to the viewing angle switching electrodes 3 corresponding to the common electrodes 6, so that the vertical electric field can be formed between the viewing angle switching electrodes 3 and the corresponding pixel electrodes 5 or between the viewing angle switching electrodes 3 and the corresponding common electrodes 6. Specifically, the first bias voltage and the second bias voltage are both equal to the average value of the pixel voltage and the common voltage.

It should be noted that, the blue phase liquid crystal display device according to the present embodiment has the following three significant advantages due to the blue phase liquid crystal layer 4 used therein. First, when the bias voltage is not applied, the blue phase liquid crystal molecules can be maintained in the optically isotropic state, so that the blue phase liquid crystal display device has a wide viewing angle and a good dark state. Second, a theoretical response time of the blue phase liquid crystal display device can reach a millisecond level or even lower, and thus a response speed thereof can be largely improved. Third, since the blue phase liquid crystal molecules can be maintained in the optically isotropic state when the bias voltage is not applied, the blue phase liquid crystal display device does not need to be configured with an orientation layer. Therefore, the manufacturing cost of the blue phase liquid crystal display device can be reduced and the manufacturing procedure thereof can be simplified.

Accordingly, the embodiment of the present disclosure further provides a method for driving the aforesaid blue phase liquid crystal display device.

Figure 7:
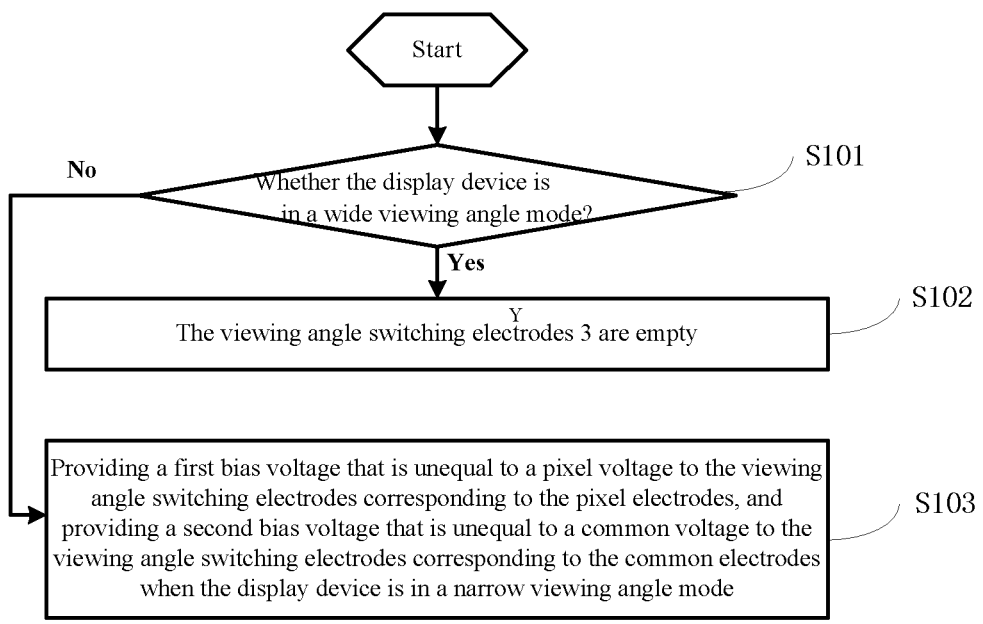
FIG. 7 is a flow chart of a method for driving the blue phase liquid crystal display device according to one embodiment of the present disclosure.

FIG. 7 is a flow chart of the method for driving the blue phase liquid crystal display device according to the embodiment of the present disclosure. The method for driving the blue phase liquid crystal display device according to the present embodiment mainly comprises step 101, step 102, and step 103.

In step 101, whether the blue phase liquid crystal display device is in a wide viewing angle mode is determined.

In step 102, if the result of step 101 is positive, the viewing angle switching electrodes 3 are empty. Then the program comes to an end.

Specifically, in step 102, the blue phase liquid crystal display device works in the wide viewing angle state, and the viewing angle switching electrodes 3 would not have any influence on the display effect of the blue phase liquid crystal display device since they are empty.

In step 103, if the result of step 101 is negative, the blue phase liquid crystal display device is in a narrow viewing angle mode. In the narrow viewing angle mode, the first bias voltage that is higher or lower than the pixel voltage is provided to the viewing angle switching electrodes 3 corresponding to the pixel electrodes 5, and the second bias voltage that is higher or lower than the common voltage is provided to the viewing angle switching electrodes 3 corresponding to the common electrodes 6, so that the vertical electric field can be formed between the viewing angle switching electrodes 3 and the corresponding pixel electrodes 5 or between the viewing angle switching electrodes 3 and the corresponding common electrodes 6. Specifically, the first bias voltage and the second bias voltage are both equal to the average value of the pixel voltage and the common voltage.

Specifically, when the first bias voltage that is higher or lower than the pixel voltage is provided to the viewing angle switching electrodes 3 corresponding to the pixel electrodes 5, and the second bias voltage that is higher or lower than the common voltage is provided to the viewing angle switching electrodes 3 corresponding to the common electrodes 6, the vertical electric field can be formed between the viewing angle switching electrodes 3 and the corresponding pixel electrodes 5 or between the viewing angle switching electrodes 3 and the corresponding common electrodes 6. The blue phase liquid crystal molecules in the vertical electric field would have a phase delay in the vertical direction under the action of the vertical electric field, and thus the blue phase liquid crystal molecules are aligned in the vertical direction. The blue phase liquid crystal molecules outside the vertical electric field are still maintained in the optically isotropic state. As shown in FIG. 6, almost all oblique light can pass through the blue phase liquid crystal molecules in the vertical alignment state. Therefore, in the driving method according to the present embodiment, the probability that the viewing angle switching dead area occurs in the blue phase liquid crystal display device can be reduced to a large extent, and thus the display effect of the blue phase liquid crystal display device in the narrow viewing angle mode can be improved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A blue phase liquid crystal display device, comprising:
   an array substrate polarizer;
   an array substrate that is formed on the array substrate polarizer;
   pixel electrodes and common electrodes that are formed on the array substrate, the pixel electrodes and the common electrodes being arranged alternately;
   a blue phase liquid crystal layer that is formed on the pixel electrodes and the common electrodes;
   a plurality of viewing angle switching electrodes that are formed on the blue phase liquid crystal layer, wherein a viewing angle switching electrode is arranged right above each of the pixel electrodes and right above each of the common electrodes;
   a color filter substrate that is formed on the viewing angle switching electrodes;
   a color filter substrate polarizer that is formed on the color filter substrate; and
   a driving circuit, wherein the driving circuit is used for providing, in a narrow viewing angle mode, a first bias voltage that is higher or lower than a pixel voltage to the viewing angle switching electrodes corresponding to the pixel electrodes, and a second bias voltage that is higher or lower than a common voltage to the viewing angle switching electrodes corresponding to the common electrodes, so that a vertical electric field is formed between the viewing angle switching electrodes and the corresponding pixel electrodes or between the viewing angle switching electrodes and the corresponding common electrodes;

wherein the first bias voltage and the second bias voltage are both equal to an average value of the pixel voltage and the common voltage.

2. The blue phase liquid crystal display device according to claim 1, wherein the viewing angle switching electrodes, the pixel electrodes, and the common electrodes are all transparent electrodes.

3. The blue phase liquid crystal display device according to claim 1, wherein the viewing angle switching electrodes each are arranged parallel to the corresponding pixel electrodes or the corresponding common electrodes.

4. The blue phase liquid crystal display device according to claim 3, wherein the viewing angle switching electrodes, the pixel electrodes, and the common electrodes are all transparent electrodes.

5. The blue phase liquid crystal display device according to claim 3, wherein a width of a viewing angle switching electrode is equal to a width of a corresponding pixel electrode or a width of a corresponding common electrode.

6. The blue phase liquid crystal display device according to claim 5, wherein the viewing angle switching electrodes, the pixel electrodes, and the common electrodes are all transparent electrodes.

7. The blue phase liquid crystal display device according to claim 5, wherein the width of the pixel electrode is equal to the width of the common electrode, and a distance between any pixel electrode and a common electrode adjacent thereto is constant.

8. The blue phase liquid crystal display device according to claim 7, wherein the viewing angle switching electrodes, the pixel electrodes, and the common electrodes are all transparent electrodes.

9. The blue phase liquid crystal display device according to claim 7, wherein a ratio of the width of the pixel electrode to the distance ranges from ⅓ to ¾.

10. A method for driving the blue phase liquid crystal display device according to claim 1, comprising:

providing, in a narrow viewing angle mode, a first bias voltage that is higher or lower than a pixel voltage to the viewing angle switching electrodes corresponding to the pixel electrodes and a second bias voltage that is higher or lower than a common voltage to the viewing angle switching electrodes corresponding to the common electrodes, so that a vertical electric field is formed between the viewing angle switching electrodes and the corresponding pixel electrodes or between the viewing angle switching electrodes and the corresponding common electrodes;

wherein the first bias voltage and the second bias voltage are both equal to an average value of the pixel voltage and the common voltage.

* * * * *